US012701592B2

(12) United States Patent
Yu et al.

(10) Patent No.: US 12,701,592 B2
(45) Date of Patent: Aug. 4, 2026

(54) ALLOCATING RESOURCES FOR DIRECT USER EQUIPMENT COMMUNICATION

(71) Applicant: Nokia Technologies Oy, Espoo (FI)

(72) Inventors: Ling Yu, Espoo (FI); Vinh Van Phan, Oulu (FI); Nuno Manuel Kiilerich Pratas, Aalborg (DK); Prajwal Keshavamurthy, Munich (DE); Jakob Lindbjerg Buthler, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 308 days.

(21) Appl. No.: 18/575,024

(22) PCT Filed: Jul. 16, 2021

(86) PCT No.: PCT/EP2021/070001
§ 371 (c)(1),
(2) Date: Dec. 28, 2023

(87) PCT Pub. No.: WO2023/284980
PCT Pub. Date: Jan. 19, 2023

(65) Prior Publication Data
US 2024/0323983 A1      Sep. 26, 2024

(51) Int. Cl.
*H04W 72/40*      (2023.01)
*H04W 72/02*      (2009.01)
*H04W 72/0446*      (2023.01)
*H04W 80/02*      (2009.01)

(52) U.S. Cl.
CPC ........... *H04W 72/40* (2023.01); *H04W 72/02* (2013.01); *H04W 72/0446* (2013.01); *H04W 80/02* (2013.01)

(58) Field of Classification Search
CPC . H04W 72/40; H04W 72/02; H04W 72/0446; H04W 80/02; H04W 76/11; H04W 72/20; H04W 76/14; H04W 76/28; H04W 92/18
See application file for complete search history.

(56) References Cited

U.S. PATENT DOCUMENTS

| | | | | |
|---|---|---|---|---|
| 2022/0346173 A1* | 10/2022 | Park | ..................... | H04W 76/18 |
| 2023/0007728 A1* | 1/2023 | Kung | ................... | H04W 72/20 |
| 2023/0050074 A1 | 2/2023 | Yu et al. | | |

FOREIGN PATENT DOCUMENTS

EP          3855862 A1      7/2021

OTHER PUBLICATIONS

"WID revision: NR sidelink enhancement", 3GPP TSG RAN Meeting #90e, RP-202846, Agenda: 9.8.3, LG Electronics, Dec. 7-11, 2020, 6 pages.

(Continued)

*Primary Examiner* — Fred A Casca
(74) *Attorney, Agent, or Firm* — Barta Jones, PLLC

(57) ABSTRACT
A method and apparatus are provided for determining an active time of a user equipment to which a sidelink communication is to be sent. A sidelink resource allocation request is generated requesting allocation of a resource for transmitting this sidelink communication, the sidelink resource allocation request having an indicator indicative of the determined active time of the user equipment.

9 Claims, 4 Drawing Sheets

(56)  References Cited

OTHER PUBLICATIONS

"Discussion on SL communication impact on Uu DRX", 3GPP TSG RAN WG2 Meeting #114-e, R2-2105593, Agenda: 8.15.2, Huawei, May 19-27, 2021, 7 pages.

"Coordination between Uu DRX and SL DRX", 3GPP TSG-RAN WG2 Meeting #114 electronic, R2-2105458, Agenda: 8.15.2, Lenovo, May 19-27, 2021, pp. 1-5.

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"3rd Generation Partnership Project; Technical Specification Group Radio Access Network; NR; NR and NG-RAN Overall Description; Stage 2 (Release 16)", 3GPP TS 38.300, V16.5.0, Mar. 2021, pp. 1-151.

International Search Report and Written Opinion received for corresponding Patent Cooperation Treaty Application No. PCT/EP2021/070001, dated Apr. 12, 2022, 12 pages.

"Coordination between Uu DRX and SL DRX", BGPP TSG-RAN WG2 Meeting #113 electronic, R2-2100931, Agenda: 8.15.2.3, Lenovo, Jan. 25-Feb. 5, 2021, 5 pages.

"Resource Allocation for eSL", 3GPP RAN WG2 Meeting #114 electronic, R2-2104868, Agenda: 8.15.3, InterDigital Inc, May, 2021, 5 pages.

"Consideration on the sidelink DRX for unicast", 3GPP TSG-RAN WG2 Meeting #114-e, R2-2105083, Agenda: 8.15.2, Huawei, May 19-May 27, 2021, 11 pages.

* cited by examiner

| Destination Index | | LCG ID |
|---|---|---|
| T-I | T-I | Timing |
| Timing | | |
| Buffer Size | | |

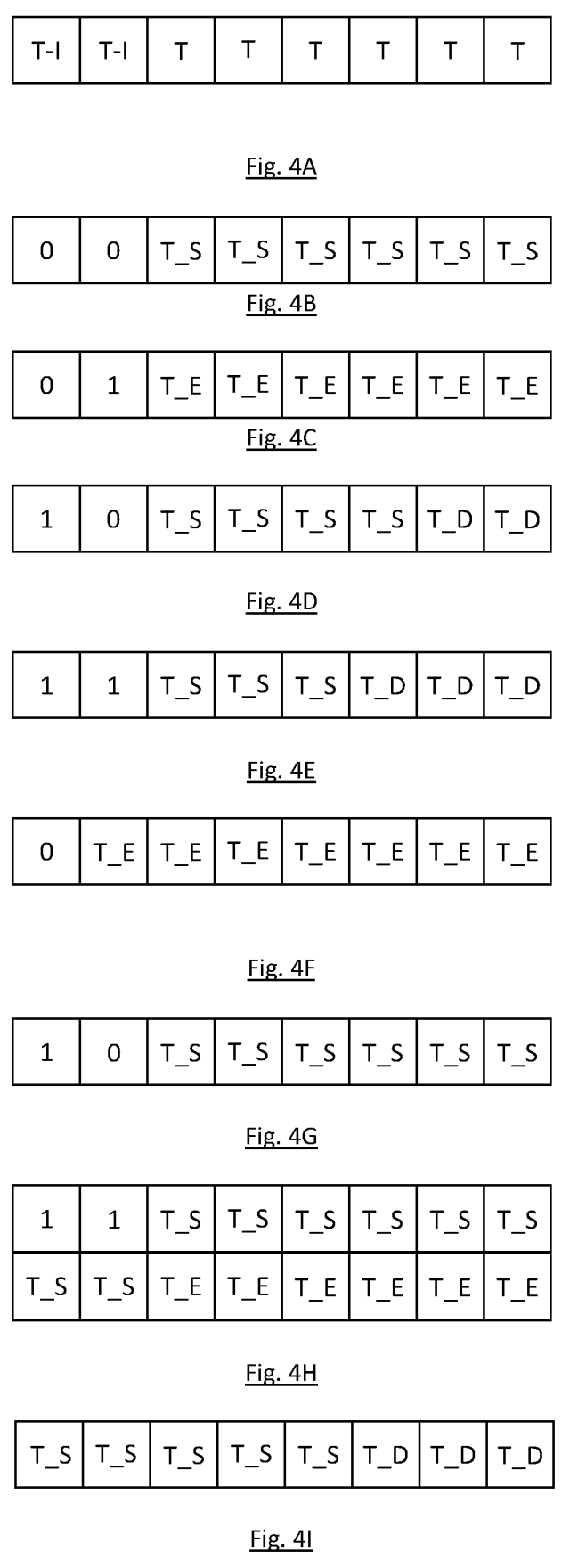

| T-I | T-I | T | T | T | T | T | T |
|-----|-----|---|---|---|---|---|---|

Fig. 4A

| 0 | 0 | T_S | T_S | T_S | T_S | T_S | T_S |
|---|---|-----|-----|-----|-----|-----|-----|

Fig. 4B

| 0 | 1 | T_E | T_E | T_E | T_E | T_E | T_E |
|---|---|-----|-----|-----|-----|-----|-----|

Fig. 4C

| 1 | 0 | T_S | T_S | T_S | T_S | T_D | T_D |
|---|---|-----|-----|-----|-----|-----|-----|

Fig. 4D

| 1 | 1 | T_S | T_S | T_S | T_D | T_D | T_D |
|---|---|-----|-----|-----|-----|-----|-----|

Fig. 4E

| 0 | T_E | T_E | T_E | T_E | T_E | T_E | T_E |
|---|-----|-----|-----|-----|-----|-----|-----|

Fig. 4F

| 1 | 0 | T_S | T_S | T_S | T_S | T_S | T_S |
|---|---|-----|-----|-----|-----|-----|-----|

Fig. 4G

| 1 | 1 | T_S | T_S | T_S | T_S | T_S | T_S |
|-----|-----|-----|-----|-----|-----|-----|-----|
| T_S | T_S | T_E | T_E | T_E | T_E | T_E | T_E |

Fig. 4H

| T_S | T_S | T_S | T_S | T_S | T_D | T_D | T_D |
|-----|-----|-----|-----|-----|-----|-----|-----|

Fig. 4I

ALLOCATING RESOURCES FOR DIRECT USER EQUIPMENT COMMUNICATION

RELATED APPLICATION

This application claims priority to PCT Application No. PCT/EP2021/070001, filed on Jul. 16, 2021, which is incorporated herein by reference in its entirety.

TECHNOLOGICAL FIELD

Various example embodiments relate to allocating resources for direct and in particular sidelink communication between user equipment.

BACKGROUND

User equipment (UE) may communicate directly with each other, in some cases using sidelink (SL) channels. There are two modes by which the allocation of the sidelink channel resources may be done, —mode 1, where the sidelink transmissions are scheduled by the network, perhaps by the NG-RAN, and mode 2 where the UE autonomously selects the SL transmission resources from a pool of resources.

A power saving aspect has been introduced so that there may be discontinuous reception DRX of SL signals at the UEs. Where SL DRX (discontinuous reception) is operational then for the transmission to be reliably received it should be transmitted during the active time of the SL DRX at the receiving UE, Rx UE. This may not be straightforward as although the network may have some visibility of SL DRX cycle, this cycle of the Rx UE may vary on occasion in a way that is not visible to the network.

It would be desirable to provide a way of allocating resources for sidelink transmissions that increased the probability that the transmissions will be successfully received.

BRIEF SUMMARY

The scope of protection sought for various embodiments of the invention is set out by the independent claims. The example, embodiments and features, if any, described in this specification that do not fall under the scope of the independent claims are to be interpreted as examples useful for understanding various embodiments of the invention.

According to various, but not necessarily all, embodiments of the invention there is provided according to a first aspect an apparatus, comprising: means for determining an active time of at least one receiving user equipment to which a sidelink communication is to be sent; means for generating a sidelink resource allocation request, requesting allocation of a resource for transmission of a sidelink resource allocation request comprising an active time indicator indicative of said determined active time of said at least one receiving user equipment.

In an example embodiment said active time indicator comprises an indication of at least one of an active start time and an active end time of said at least one receiving user equipment.

In an example embodiment said resource allocation request further comprises an indication of a duration of said active time.

In an example embodiment said active time indicator comprises a number of time slots from the time of transmission of said resource allocation request.

In an example embodiment where said active time indicator consists of an indication of said start time and in response to an allocated sidelink resource not being before said active end time, said apparatus is configured to select a sidelink resource from a pool of resources and to transmit a sidelink signal on said selected sidelink resource to said at least one receiving user equipment so as to trigger said active time to be extended.

In an example embodiment said resource allocation request further comprises a format indicator indicative of a type and number of active time indications provided in said request.

In an example embodiment said apparatus is configured to transmit said resource allocation request in a MAC CE, medium access control layer control element.

In an example embodiment said MAC CE comprises a dedicated MAC CE for transmitting said resource allocation request including said active time indicator.

In an example embodiment said MAC CE comprises a logical channel identifier LCID unique to said dedicated MAC CE and identifying said MAC CE as said resource allocation request comprising said active time indicator.

In an example embodiment said resource allocation request comprises a buffer status report extended to include said active time indicator.

In an example embodiment said buffer status report comprises an identifier identifying said buffer status report as a buffer status report comprising said active time indicator.

According to various, but not necessarily all, embodiments of the invention there is provided according to a second aspect an apparatus, comprising: means responsive to receipt of a sidelink resource allocation request requesting resource for sidelink communications between a transmitting and at least one receiving user equipment, said sidelink resource allocation request including an active time indicator indicative of a determined active time of said at least one receiving user equipment, to allocate a resource for said sidelink communication in dependence upon said active time indicator.

In an example embodiment said means is responsive to said active time indicator indicating only a start of said active time to select a suitable resource that is closest to said start of said active time as said resource to allocate.

In an example embodiment said means is responsive to said active time indicator indicating both a start and end of said active time, to select an available resource within said active time duration as said resource to allocate.

In an example embodiment the means comprise: at least one processor; and at least one memory including computer program code, the at least one memory and computer program code being configured to, with the at least one processor, cause the performance of the apparatus.

According to various, but not necessarily all, embodiments of the invention there is provided according to a third aspect a system comprising a user equipment comprising an apparatus according to a first aspect for transmitting sidelink communications to at least one receiving user equipment, and a network node comprising an apparatus according to a second aspect for allocating sidelink resource to said user equipment.

According to various, but not necessarily all, embodiments of the invention there is provided according to a fourth aspect a method comprising: determining an active time of at least one user equipment to which a sidelink communication is to be sent; and generating a sidelink resource allocation request, requesting allocation of a resource for transmitting a sidelink communication to said at least one user equipment, said sidelink resource allocation request comprising an indicator indicative of said determined active time of said at least one user equipment.

In an example embodiment where said active time indicator consists of an indication of said start time, said method further comprises in response to said allocated resource not being before said active end time, selecting a sidelink resource from a pool of resources and transmitting a sidelink signal on said selected sidelink resource to said at least one receiving user equipment so as to trigger said active time to be extended.

In an example embodiment said method comprises transmitting said resource allocation request in a MAC CE, medium access control layer control element.

According to various, but not necessarily all, embodiments of the invention there is provided according to a fifth aspect a method comprising in response to receipt of a sidelink resource allocation request requesting resource for sidelink communications between a transmitting and at least one receiving user equipment, said sidelink resource allocation request including an active time indicator indicative of a determined active time of said at least one receiving user equipment, allocating a resource for said sidelink communication in dependence upon said active time indicator.

In an example embodiment said method further comprises in response to said active time indicator indicating only a start of said active time selecting a suitable resource that is closest to said start of said active time as said resource to allocate.

In an example embodiment said method further comprises in response to said active time indicator indicating both a start and end of said active time, selecting an available resource within said active time duration as said resource to allocate.

According to various, but not necessarily all, embodiments of the invention there is provided according to a sixth aspect a computer program comprising computer readable code which when executed by a processor is operable to control said processor to perform a method according to a fourth or a fifth aspect.

According to various, but not necessarily all, embodiments of the invention there is provided an apparatus, comprising: determining circuitry configured to determine an active time of at least one receiving user equipment to which a sidelink communication is to be sent; and generating circuitry configured to generate a sidelink resource allocation request, requesting allocation of a resource for transmission of a sidelink resource allocation request comprising an active time indicator indicative of said determined active time of said at least one receiving user equipment.

According to various, but not necessarily all, embodiments of the invention there is provided according to a further aspect an apparatus, comprising: allocation circuitry configured to respond to receipt of a sidelink resource allocation request requesting resource for sidelink communications between a transmitting and at least one receiving user equipment, said sidelink resource allocation request including an active time indicator indicative of a determined active time of said at least one receiving user equipment, by allocating a resource for said sidelink communication in dependence upon said active time indicator.

In an example embodiment said allocation circuitry is configured to respond to said active time indicator indicating only a start of said active time to select a suitable resource that is closest to said start of said active time as said resource to allocate.

In an example embodiment said allocation circuitry is responsive to said active time indicator indicating both a start and end of said active time, to select an available resource within said active time duration as said resource to allocate.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which:

FIG. 1 shows an example embodiment of a side link resource allocation request in the form of a buffer status report;

FIG. 2 schematically shows signalling between a receiving UE, a transmitting UE and a network node;

FIGS. 4A to 4I show example formats of indication of active time provided in the resource allocation request.

DETAILED DESCRIPTION

Figures 1, 2:
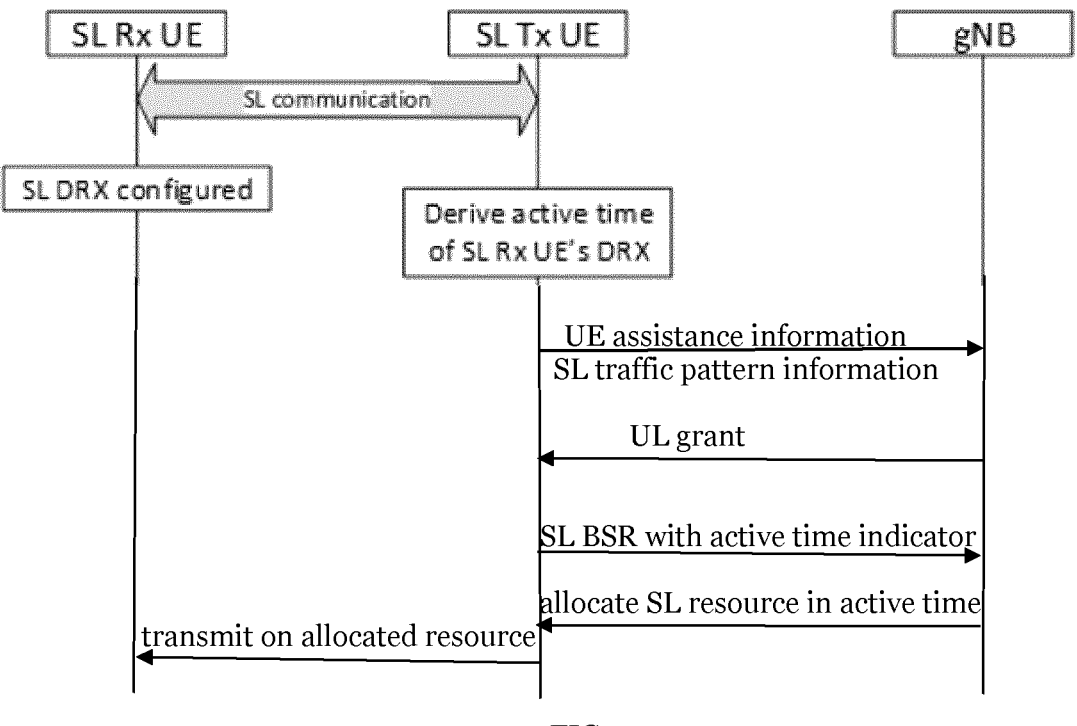

Before discussing the example embodiments in any more detail, first an overview will be provided.

Example embodiments relate to sidelink (SL) communications between user equipment. Sidelink communications have been used for V2X communications (vehicle to everything) where conventionally the UE was always on. However, power saving has been introduced for sidelink communications making them more applicable for vulnerable road users and for UEs in public safety and commercial use cases. Where power saving has been introduced the user equipment may operate in a discontinuous reception mode DRX, so that at times a UE is not active and not able to receive a signal.

There are two potential modes of sidelink operation: mode 1 where—the sidelink transmission resource is scheduled by the network node, which may be a gNB that is a 5G network node; or—mode 2 where the UE autonomously selects a sidelink transmission resource from a pool of resources. Where sidelink DRX is used a receiving UE is periodically in an inactive mode to save power and is unable to receive signals. This can present problems when allocating resources for the sidelink communications as were the resource to be allocated in an inactive time period of the receiving UE, then the signal would not be received. With mode 1 allocation of resources by the gNB, the gNB may not have sufficient information on whether the receiving UE is active or not and thus, may be unable to guarantee that any resource allocated is within an active time period of the receiving UE.

It was recognised that the transmitting user equipment requesting the resource for the sidelink transmission—the Tx UE may have additional information regarding the active times of the receiving UE Rx UE to that available at the gNB. Thus, one way of addressing this problem is to provide an indication of the Rx UE's active time within the request for allocation of sidelink resource sent by the Tx UE. In this regard for mode 1 allocation of resource the Tx UE transmits a request to the network node that may be in the form of a buffer status report BSR and that includes information on the destination of the SL communication, the logical channel group, the buffer size of the SL data to be transmitted. Providing additional information in this request regarding the active time of the Rx UE allows the network node to take account of the active and inactive times of the Rx UE when allocating SL resources.

It should be noted that the active time of the SL DRX configuration may vary for each DRX cycle depending on the interval of SL new transmissions, the need for HARQ retransmission and/or the other groupcast transmitting UE's transmissions in the case that the SL DRX is configured for SL groupcast. Furthermore, where the transmitting UE has aperiodic sidelink traffic, the active time of the receiving UE may become more difficult to predict from the parameters of the SL DRX configuration. Therefore, it may not be sufficient for the gNB to derive the active time of SL Rx UE where the Tx UE only reports the configured DRX parameters and timers to the gNB, as other information that may impact the active time of SL DRX may be missing. Providing an indication of the active and inactive times of the Rx UE rather than the DRX configuration information allows the current active time to be derived and resources allocated accordingly.

The active time indicator provided by the Tx UE in the request may comprise an indication of an active start time and/or an active end time. The active end time may be indicated by an actual time stamp or by an indication of a current remaining active time duration or by indicating of a number of time slots.

Where the indication is a start time and the resource allocation provided in response is not within the active time of the Rx UE, then the transmitting user equipment where it supports both mode 1 and mode 2 allocation of sidelink resources may use mode 2 allocation by selecting a resource from a pool of resources to transmit a sidelink control information (SCI) or a sidelink control signal or a control message or a data block, commonly referred to as a message, to the receiving UE prior to the end of the active time of this UE, in order to prolong the active time of the receiving UE such that the provided resource allocation is within this prolonged time and therefore can be used effectively for sidelink transmission to the Rx UE.

A nature of the time indicator provided within the resource allocation request may be indicated by a format indicator transmitted with the resource allocation request.

The resource allocation request may be transmitted as a MAC CE that is specific to an allocation request that includes an active time indicator. In another option, the resource allocation request may be transmitted in a Radio Resource Control (RRC) message. For example, RRC Sidelink UE Information or UE Assistance Information may be used for transmitting the resource allocation request.

Resource allocation requests from the user equipment for sidelink resources have in some cases been performed using a buffer status report BSR. In some embodiments this buffer status report has been extended to include the active time indicator. An identifier identifying the buffer status report as such an extended buffer status report may be transmitted with it.

Example embodiments are based on the idea that information of the active time of SL Rx UE's that operate in discontinuous reception mode DRX should be made available to the SL Tx UE's serving gNB in order for resources for sidelink communications in mode 1 to be reliably allocated. In some example embodiments a new information element (IE) in SL-BSR (buffer status report) is provided to give the active time information of SL Rx UE's DRX to the serving gNB of the Tx UE.

Example Embodiments Include:

The SL-BSR is enhanced/extended to include the timing information that reflects the active time of SL Rx UE's DRX facilitating the gNB to allocate SL mode 1 resources to the Tx UE within the active time.

To save signalling overhead, either the starting time and/or ending time of the active time of SL Rx UE's DRX is indicated in SL BSR. In addition, a format indication may be used in SL-BSR to allow SL Tx UE to indicate whether starting time, ending time, or both (active time duration) is provided in the report. Particularly, where both starting and ending time is provided, efficient coding of time information field may be used. In one example embodiment, if the SL-BSR is reported by SL Tx UE during the active time of SL Rx UE's DRX, the Tx UE can indicate using at least the format indication (e.g., o, or oo) that the ending time, or time till end (i.e. remaining duration) of the active time of the SL Rx UE's DRX is provided in the timing information of SL BSR. In this case, the gNB should schedule SL mode 1 resources before the ending time of the active time of SL Rx UE's DRX.

In another example embodiment, if the SL-BSR is reported by SL Tx UE before the active time of SL Rx UE's DRX, the following two options are proposed:

In one option, Tx UE uses the format indication (e.g., 1, or 01) to only indicate the starting time, or time till start of active time of SL Rx UE's DRX that is provided in the timing information of SL BSR. In this case, gNB should schedule SL mode 1 resources after the starting time of active time of SL Rx UE's DRX, but the allocated resource should be as close to the starting time as possible given the suitable resources that are available.

In another option, Tx UE uses the format indication (e.g., 1 or 10) to indicate the starting time, as well as the ending time (or the active time duration) of the active time of SL Rx UE's DRX is in the timing information. In this case, the gNB should schedule SL mode 1 resources after the starting time of the active time of SL Rx UE's DRX and before the ending time of the active time of SL Rx UE's DRX. In the option, flexible number of bits in timing information field of SL-BSR may be used to indicate the starting time as well as the duration (which in turn indicates end time) of the active time of SL Rx UE's DRX. This (i.e. the number of bits for starting time and duration of the active time of SL Rx UE's DRX information) can be indicated using additional format indicator bits/values (e.g., 10 or 11).

In order for the network node gNB to be able to differentiate the legacy SL-BSR and the new SL-BSR that includes timing information, a new MAC CE with a new LCID (logical channel identifier) of UL-SCH (uplink shared channel) may be specified.

As discussed above, the active time of SL Rx UE's DRX may be rather dynamic due to flexible design of SL DRX parameters and timers. In the case of SL unicast, SL Tx UE should be able to identify or determine the active time of Rx UE at least for the unicast connection between SL Tx UE and Rx UE, e.g., based on the exchange of DRX configuration, SL transmissions, the reserved resources as indicated in SCIs (sidelink control information) and/or the need of HARQ (hybrid automatic repeat request) retransmissions, etc. If the SL Rx UE has multiple SL connections with different DRX configuration, the consolidated active time may be indicated explicitly or implicitly from Rx UE to Tx UE over SL to allow the Tx UE to take the consolidated active time into account when the proposed new SL-BSR that includes timing information is reported to the gNB. In the case of SL groupcast, SL Tx UE can identify the active time of Rx UE members of the SL groupcast's group not only based on its own SL transmission and the groupcast common DRX configuration, but also SL groupcast transmissions within the group, e.g. the extension of active time with start of inactivity timer triggered by SL transmission of other group member.

One example of the proposed new SL-BSR (buffer status report) format is illustrated in FIG. 1. The new SL-BSR is used by SL Tx UE to report SL buffer for requesting dynamic grant of mode 1 resource allocation when the peer SL Rx UE is configured with SL DRX. The T-I bits (e.g. 2 bits) are used to indicate whether the following timing information is the starting and/or ending point of the active time of Rx UE's DRX. The format of the timing information is shown in more detail in FIG. 4.

FIG. 2 shows a signalling diagram indicating schematically the signalling between a transmitting UE-Tx UE and a receiving UE-Rx UE which are communicating using sidelink communications. In this example, there are sidelink communications between the UEs. When the receiving UE enters a power saving mode where the discontinuous reception mode DRX is configured then the Tx UE derives the active time of the receiving UE's discontinuous reception mode DRX and transmits at least one indicator of this within the buffer status report SL-BSR on an uplink channel. In order to send the SL-BSR to the gNB, SL Tx UE needs to be allocated with an UL grant and this signalling is schematically shown. This may be granted taking account of the SL traffic pattern of the Tx UE. In this regard the Tx UE may have provided to the gNB the SL traffic pattern information in UEAssistanceInformation message as UE assistance information for SL configured grant allocation. In one embodiment, the gNB may also schedule UL configured grant in addition to SL configured grant according to SL traffic pattern information to provide the resources for the Tx UE to send SL-BSR to the gNB to provide the updated information regarding the active time of SL DRX in Rx UE side.

The gNB will seek to allocate sidelink resources within the active time indicated by the indicator and transmit this information to the Tx UE. In this regard, if the indicator indicates a start time then suitable resources close to but shortly after this start time will be allocated. Where an end time is indicated then resources before this end time will be allocated and where the start and end times are indicated resources within this active time will be allocated. The Tx UE can then transmit a sidelink communication to the Rx UE on this allocated resource.

Figure 3:
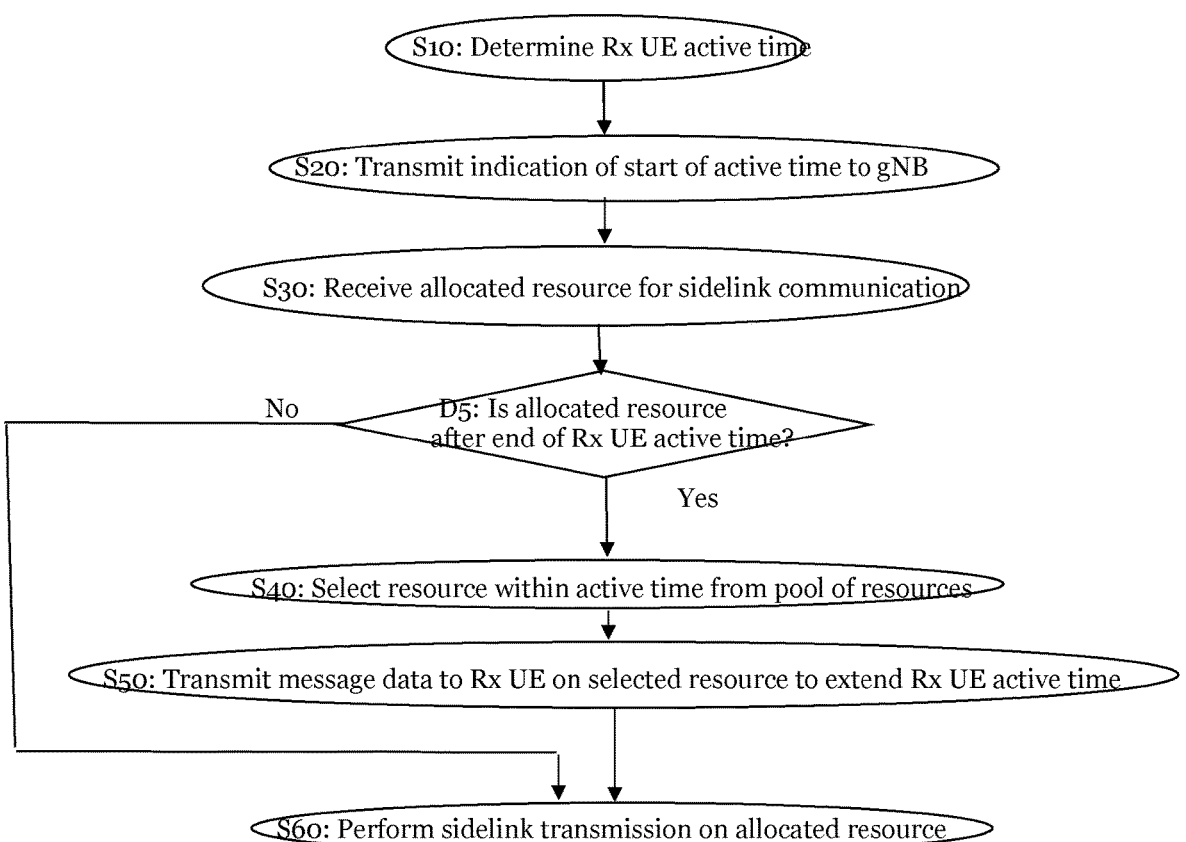
FIG. 3 shows a flow diagram illustrating steps in a method according to an example embodiment.

FIG. 3 shows steps in a method according to some embodiments. At step S10 the transmitting UE determines the receiving UE's active time. At step S20 the transmitting UE transmits an indication of the active time to the gNB. In this example embodiment the indication indicates the start of the active time and this is transmitted within a request for allocation of sidelink resources. In some embodiments this is within an extended buffer status report.

At step S30 the transmitting UE receives the allocated resource for sidelink communication. At step D5 the transmitting UE determines whether the allocated resource occurs after the end of the receiving UE's active time. In this regard as in this embodiment the indication of the active time that was transmitted to the gNB is the start of the active time then as the gNB is unaware of the end of the active time, it may be that the gNB allocates resource that occurs after the end of the active time. Where this is the case the transmitting UE, after receiving this allocation, recognises the problem and can address this by at step S40 selecting resource that is within the active time of the receiving UE's active time period from a pool of resources that are available for mode 2 sidelink communications. At step S50 the transmitting UE may then transmit a message to the Rx UE using the resource selected from the pool of resources. The receipt of this message prolongs the receiving UE's active time period, so that it is active when the allocated sidelink resource received from the gNB in step S30 is available. At step S60 the sidelink transmission is transmitted on the allocated resource to the now active Rx UE.

Where it is determined at D5 that the allocated resource is not past the end of the receiving UE's active time then step S60 of transmitting the sidelink transmission on the allocated resource is performed.

Possible formats of the active time indicators that the transmitting UE, Tx UE sends to the gNB are set out in FIG. 4A to 4I. This information may in these examples be one or two bytes long. Where it is one byte long the first two bits, T-I may indicate the format of the information provided and the possible coding is summarised in the following table.

| T-I | Description of format for six-bit timing information |
|-----|-----|
| 00 | Timing information (all 6 bits) contains starting time of active time of SL Rx UE's DRX |
| 01 | Timing information (all 6 bits) contains stop time (or remaining duration) of active time of SL Rx UE's DRX |
| 10 | First 4 bits contain starting time and last 2 bits contain duration of active time of SL Rx UE's DRX |
| 11 | First 3 bits contain starting time and last 3 bits contain duration of active time of SL Rx UE's DRX |

FIG. 4A illustrates an example octet (byte) format in SL-BSR where T-I and T are the place holders for T-I format indicator and timing information bits. FIG. 4B to FIG. 4E illustrate the octets with the four different possible T-I format indicators as shown in the table, and with the timing information bit strings, where T_S, T_D and T_E denote the bits indicating the starting time, duration and ending time, respectively, of the active time of SL Rx UE's DRX.

The following table provides another possible example of T-I indicator format that may allow more flexibility in indicating the different timing information content. In this example, either one byte or 2 byte T-I and timing information fields can be flexibly indicated depending on the current need, these are illustrated in FIG. 4F to 4I. In the case that both starting time and ending time (or duration) of active time of SL Rx UE's DRX is reported in SL-BSR, the flexible number of bits to indicate T_S and T_E similar to that illustrated in FIGS. 4D and 4E can be exploited instead of using the fixed division between T_S and T_E bits as illustrated in FIG. 4H. In this case, one additional T-I format indicator bit may be required to indicate two different division of the remaining 13 bits for T_S and T_E bits respectively. For example, "110" is used to indicate 5 bits for T_S and 8 bits for T_E and "111" is used to indicate 8 bits for T_S and 5 bits for T_E.

| Description of format for timing information | |
|---|---|
| T-I | and additional T-I indicator |

| | | Description of format for timing information and additional T-I indicator |
|---|---|---|
| 0 | | Timing information (rest 7 bits) contains ending time (remaining duration) of active time of SL Rx UE's DRX |
| 1 | | additional T-I indicator and Timing information contains at least starting time of active time of SL Rx UE's DRX |
| 1 | 0 | Timing information (rest 6 bits) contains starting time of active time of SL Rx UE's DRX |
| 1 | 1 | Timing information (rest 14 bits) contains starting time and ending time (or duration) of active time of SL Rx UE's DRX |

One potential problem that may arise when SL Tx UE indicates only the starting point of active time in SL-BSR, is that the gNB may schedule SL mode 1 resources after the ending point (i.e. out of active time) as there is no information on the length of active time. In this case, SL Tx UE may be allowed to use SL mode 2 resource allocation to make SL transmission during the active time to trigger starting of SL DRX inactivity timer for active time extension. In this way, the allocated mode 1 resources from gNB may be within the active time of Rx UE's DRX. The selected mode 2 resource can be limited to transmit a message. This message can be a SCI (sidelink control information), a control signal, a data block or a control message such as a MAC CE (e.g. for SL Channel State Information report where the sidelink between Tx UE and Rx UE is a unicast sidelink). This was described in FIG. 3.

In one embodiment, the start time and end time reported in the time information in SL BSR can be the time offset (e.g., in terms of number of time slots) from the point when SL BSR/PUSCH was sent from the Tx UE to the gNB to the starting time and/or ending time of active time of SL Rx UE's DRX. The duration can be the time offset (e.g., in terms of number of time slots) from the starting time to the ending time of active time of SL Rx UE's DRX.

In one embodiment, time information can be indicated using index of time levels (in time slots) to allow for larger time values to be indicated using fewer bits. The following table provides example time levels for 4-bit time information field defining 16 time levels, (note: 4-bit time information filed is assumed in this table for ease of illustration. In case of 6-bit and 8-bit time information fields, 64 and 256 time levels are possible.)

| Index | time value |
|---|---|
| 0 | 0 |
| 1 | ≤10 |
| 2 | ≤14 |
| 3 | ≤20 |
| 4 | ≤28 |
| 5 | ≤38 |
| 6 | ≤53 |
| 7 | ≤74 |
| 8 | ≤102 |
| 9 | ≤142 |
| 10 | ≤198 |
| 11 | ≤276 |
| 12 | ≤384 |
| 13 | ≤535 |
| 14 | ≤745 |
| 15 | ≤1038 |

It is noted, when the starting time is to be reported, an index that corresponds to the lowest time value in the table that is equal to or greater than the time corresponding to the actual starting time of active time of SL Rx UE's DRX is indicated. This allows for the gNB to schedule SL mode 1 resources after the starting time. On the other hand, when the ending time is to be reported, index that corresponds to the highest time value in the table that is equal to or less than the time corresponding to the actual ending time of active time of SL Rx UE's DRX is indicated. This allows for gNB to schedule SL mode 1 resources before the ending time. Similarly, when the duration of the active time is to be reported (when e.g., T-I is 10 or 11), index that corresponds to the highest time value in the table that is equal to or lesser than the time corresponding to the active time duration of SL Rx UE's DRX is indicated.

In one embodiment, T-I format indicator may be omitted and a fixed number of bits can be configured to indicate starting time as well as the duration (which in turn indicates end time) of active time of SL Rx UE's DRX as illustrated in FIG. 4I. Thus a higher number of bits can be used for timing information indication which allows for higher granularity and/or large time value reporting.

In one embodiment, the proposed enhanced SL-BSR is always used when the target SL Rx UE has an active DRX configuration. However, when the target SL Rx UE does not have an active DRX configuration, the SL Tx UE can still utilize the enhanced SL-BSR if the priority and/or packet delay budget (PDB) of the associated transmission is above a configured threshold.

Figure 5:
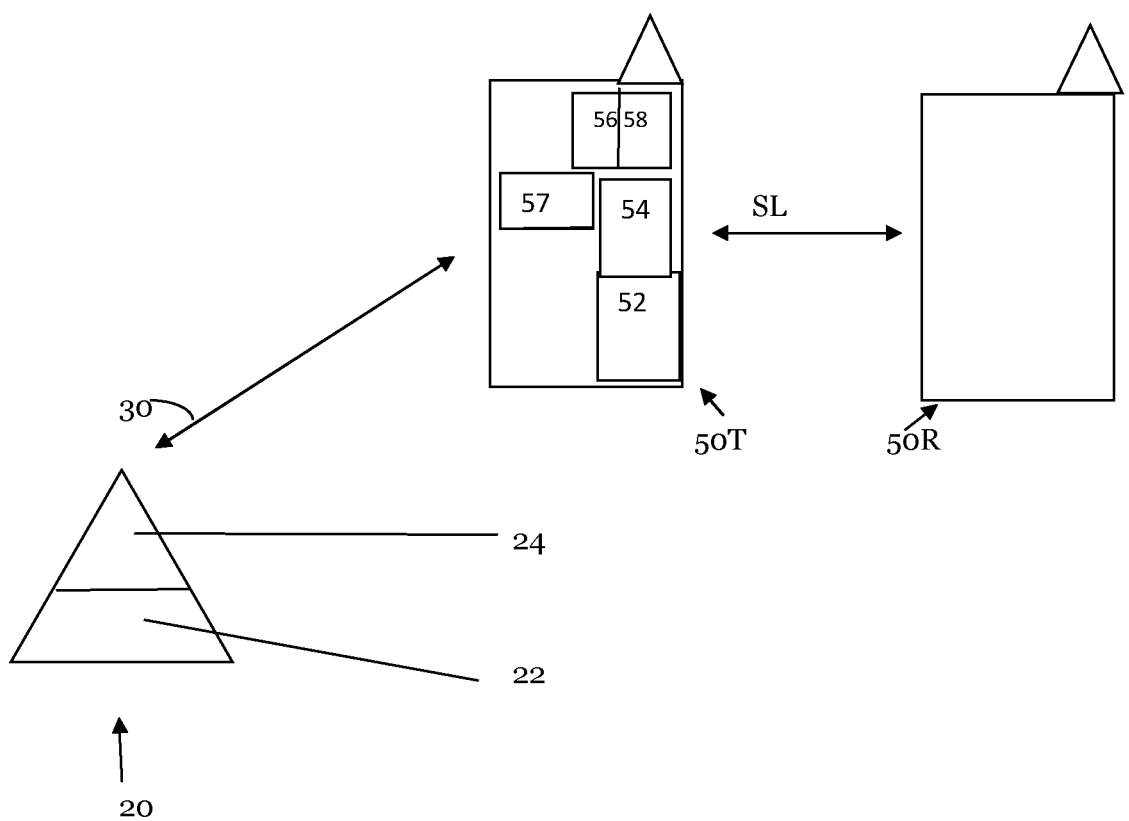
FIG. 5 schematically shows a transmitting UE, a receiving UE and a network node according to an example embodiment.

FIG. 5 shows a system according to an example embodiment comprising a network node 20, a transmitting UE 50T and a receiving UE 50R. The UEs are communicating directly with each other using sidelink communications. They may be user equipment on a vehicle in a platoon, or user equipment transmitting directly to each other in for example public safety or commercial use case.

The transmitting UE 50T comprises determining circuitry 52 configured to determine an active time for the user equipment receiving the communication-receiving user equipment 50R. It also comprises generating circuitry 54 configured to generate a sidelink resource allocation request for requesting allocation of a resource for transmission of the sidelink communication towards the receiving user equipment 50R. The generating circuitry 54 is configured to generate a request having an active time indicator that is indicative of the determined active time determined by determining circuitry 52.

Once generated transmitting circuitry 56 transmits the request 30 towards network node 20 which in this embodiment is a 5G network node that is a gNB. The request may be in the form of an extended buffer status report and is received at network node 20 by receiving/transmitting circuitry 24 and sent to allocation circuitry 22. Allocation circuitry 22 allocates a resource for the sidelink communication between the UE 50T and UE 50R in response to receipt of the request and in dependence upon the indicated active time. That is the allocation circuitry 22 selects a suitable resource for sidelink communication between the transmitting and receiving user equipment that is within the active time indicated within the request.

Where the indication of the active time comprises only an indication of a start of the active time then the allocation circuitry 22 selects a suitable resource that is as close a possible to this start time, that is a suitable resource that occurs at or soon after the indicated start time. Where the indication indicates a time duration then activation circuitry 22 selects a resource that is within this time duration. Where an end time is indicated then a resource prior to this end time is selected.

Once the resource has been selected by allocation circuitry 22 an indication of the resource is transmitted by transmitting/receiving circuitry 24 towards the transmitting UE 50T where it will be received by receiving circuitry 58. Once received control circuitry 57 will control transmitting circuitry 56 to transmit the sidelink message towards receiving UE 50R using the allocated resource. The allocated resource has been selected in consideration of the time when the receiving UE 50R is active, such that sidelink communication between the transmitting and receiving user equipment should be reliably received even though the receiving user equipment may be operating in a lower power mode with a discontinuous reception cycle.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

It should also be appreciated that the determining circuitry, generating circuitry and control circuitry may be a single or multiple processors programmed or configured to perform the operations specified.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. An apparatus, comprising:
at least one processor; and
at least one memory including computer program code, the at least one memory and computer program code being configured to, with the at least one processor, cause the apparatus to perform at least:
operating as a transmitting user equipment (Tx UE) for sidelink communications in a mode-1 sidelink resource allocation framework;
determining, based on sidelink signaling exchanged with a receiving user equipment (Rx UE), a current active time of a discontinuous reception (DRX) cycle of the Rx UE, wherein the determining comprises deriving the current active time based on:
a sidelink DRX configuration of the Rx UE,
sidelink transmissions exchanged between the Tx UE and the Rx UE, or
a hybrid automatic repeat request (HARQ)-related activity affecting the Rx UE;
generating an extended sidelink buffer status report (SL-BSR) for requesting a dynamic mode-1 sidelink resource allocation from a network node, wherein the extended SL-BSR includes:
an active-time indicator associated with the Rx UE, and
a format indicator that explicitly specifies whether the active-time indicator represents:
a start time of the active time,
an end time of the active time, or
a duration of the active time;
encoding the active-time indicator as a time offset relative to transmission of the extended SL-BSR, wherein the time offset is expressed as a number of sidelink time slots; and
transmitting the extended SL-BSR to the network node on an uplink shared channel (UL-SCH) using a logical channel identifier (LCID) that distinguishes the extended SL-BSR from a legacy sidelink buffer status report, wherein the extended SL-BSR enables the network node to allocate a sidelink transmission resource that occurs within the determined active time of the Rx UE.

2. The apparatus according to claim 1, wherein said active time indicator comprises an indication of at least one of an active start time and an active end time of said at least one receiving user equipment.

3. A method comprising:
operating as a transmitting user equipment (Tx UE) for sidelink communications in a mode-1 sidelink resource allocation framework;
determining, an based on sidelink signaling exchanged with a receiving user equipment (Rx UE), a current active time of a discontinuous reception (DRX) cycle of the Rx UE, wherein the determining comprises deriving the current active time based on:

a sidelink DRX configuration of the Rx UE, sidelink transmissions exchanged between the Tx UE and the Rx UE, or a hybrid automatic repeat request (HARQ)-related activity affecting the Rx UE;

generating an extended sidelink buffer status report (SL-BSR) for requesting a dynamic mode-1 sidelink resource allocation from a network node, wherein the extended SL-BSR includes:

an active-time indicator associated with the Rx UE, and a format indicator that explicitly specifies whether the active-time indicator represents:

a start time of the active time, an end time of the active time, or a duration of the active time;

encoding the active-time indicator as a time offset relative to transmission of the extended SL-BSR, wherein the time offset is expressed as a number of sidelink time slots; and transmitting the extended SL-BSR to the network node on an uplink shared channel (UL-SCH) using a logical channel identifier (LCID) that distinguishes the extended SL-BSR from a legacy sidelink buffer status report, wherein the extended SL-BSR enables the network node to allocate a sidelink transmission resource that occurs within the determined active time of the Rx UE.

4. The method of claim 3, wherein the active-time indicator comprises an indication of a start time of the active time of the Rx UE and an end time of the active time of the Rx UE.

5. The method of claim 4, wherein the active-time indicator further comprises an indication of a duration of the active time of the Rx UE, and wherein the format indicator specifies whether the active-time indicator represents the start time, the end time, or the duration.

6. The method of claim 3, wherein the time offset expressed as the number of sidelink time slots is quantized using an index selected from a plurality of predefined time levels, such that the index corresponds to a lowest time value that is greater than or equal to an actual start time of the active time or to a highest time value that is less than or equal to an actual end time of the active time.

7. The method of claim 3, wherein the extended SL-BSR is transmitted as a medium access control (MAC) control element (CE) on the uplink shared channel.

8. The method of claim 7, wherein the MAC CE comprises a dedicated MAC CE identified by a logical channel identifier (LCID) that is distinct from LCIDs associated with legacy sidelink buffer status reports.

9. The method of claim 3, further comprising:

in response to receiving an allocated mode-1 sidelink resource that occurs outside the determined active time of the Rx UE, selecting a sidelink resource from a pool of resources for mode-2 sidelink communications and transmitting a sidelink signal to the Rx UE to trigger extension of the active time, such that the allocated mode-1 sidelink resource occurs within the extended active time.

* * * * *